(12) United States Patent
Aoki et al.

(10) Patent No.: US 11,498,400 B2
(45) Date of Patent: Nov. 15, 2022

(54) SUNROOF DEVICE

(71) Applicant: AISIN CORPORATION, Kariya (JP)

(72) Inventors: Yuya Aoki, Kariya (JP); Shota Motomura, Kariya (JP); Katsutoshi Kato, Kariya (JP)

(73) Assignee: Aisin Corporation, Aichi (JP)

(*) Notice: Subject to any disclaimer, the term of this patent is extended or adjusted under 35 U.S.C. 154(b) by 436 days.

(21) Appl. No.: 16/823,930

(22) Filed: Mar. 19, 2020

(65) Prior Publication Data

US 2021/0061076 A1    Mar. 4, 2021

(30) Foreign Application Priority Data

Aug. 30, 2019  (JP) .............................. JP2019-158049

(51) Int. Cl.

| | |
|---|---|
| *B60J 7/043* | (2006.01) |
| *B60J 7/047* | (2006.01) |
| *B60J 7/057* | (2006.01) |
| *E05D 15/06* | (2006.01) |
| *B60J 7/05* | (2006.01) |

(52) U.S. Cl.
CPC .............. *B60J 7/043* (2013.01); *B60J 7/047* (2013.01); *B60J 7/05* (2013.01); *E05D 15/0604* (2013.01); *E05D 15/0621* (2013.01); *B60J 7/057* (2013.01); *B60J 7/0573* (2013.01); *E05Y 2201/684* (2013.01); *E05Y 2900/542* (2013.01)

(58) Field of Classification Search
CPC ..... B60J 7/02; B60J 7/043; B60J 7/047; B60J 7/05; B60J 7/057; B60J 7/0573; E05D 15/0604; E05D 15/0621; E05Y 2201/684; E05Y 2900/542; E05F 5/003; E05F 5/06; Y10T 16/37

USPC ... 296/1.03, 216.04, 216.06, 216.07, 216.08, 296/216.09, 220.01, 221, 222, 223; 16/93 R

See application file for complete search history.

(56) References Cited

U.S. PATENT DOCUMENTS

| | | | |
|---|---|---|---|
| 9,290,086 B2 | 3/2016 | Ohdoi et al. | |
| 9,796,252 B2 | 10/2017 | Nagashima et al. | |

FOREIGN PATENT DOCUMENTS

| | | | | |
|---|---|---|---|---|
| JP | 2013-216244 | | 10/2013 | |
| JP | 2017-081469 | | 5/2017 | |
| JP | 2018131020 | A  * | 8/2018 | ............... B60J 7/05 |

OTHER PUBLICATIONS

Fujisawa et al., "Vehicular Sunroof Device", Aug. 23, 2018, Japanese Patent Office, Edition: JP2018131020A, (Year: 2018).*

* cited by examiner

*Primary Examiner* — Dennis H Pedder
*Assistant Examiner* — Joyce Eileen Hill
(74) *Attorney, Agent, or Firm* — Finnegan, Henderson, Farabow, Garrett & Dunner, LLP

(57) ABSTRACT

In a sunroof device, each support member and each driving shoe include a pressing portion and an elastic body, respectively, that, when the driving shoe moves from a first position toward a second position, come close to each other and, when the driving shoe is positioned between the second position and a third position, come into contact with each other. When the driving shoe is positioned between the second position and the third position, the pressing portion presses the elastic body in a direction perpendicular to a width direction. A length in the width direction of the elastic body is longer than the pressing portion.

12 Claims, 7 Drawing Sheets

SUNROOF DEVICE

CROSS REFERENCE TO RELATED APPLICATIONS

This application is based on and claims priority under 35 U.S.C. § 119 to Japanese Patent Application 2019-158049, filed on Aug. 30, 2019, the entire content of which is incorporated herein by reference.

TECHNICAL FIELD

This disclosure relates to a sunroof device.

BACKGROUND DISCUSSION

In JP2013-216244A (Reference 1), a sunroof device is described that includes a movable panel that opens and closes an opening portion formed in a roof of a vehicle, support members that are fixed to the movable panel, guide rails that extend in a vehicle front-rear direction at both edge portions in a vehicle width direction of the opening portion, and sliders that move along the guide rails. The sliders, by moving in the vehicle front-rear direction, change postures of the support members or move in the vehicle front-rear direction in conjunction with the support members.

The sunroof device, by moving the sliders to a rear side of the vehicle when the movable panel is in a fully closed state of closing the opening portion, causes a rear edge portion of the movable panel to descend with respect to a front edge portion thereof via the support members. In other words, the sunroof device causes the movable panel to transition from the fully closed state to a descended state. Further, the sunroof device, by moving the sliders to the rear side of the vehicle when the movable panel is in the descended state, causes the movable panel to move to the rear side of the vehicle via the support members. In other words, the sunroof device, by housing the movable panel below the roof, causes the movable panel to transition from the descended state to a fully open state.

In the sunroof device as described above, when the movable panel transitions from the descended state to the fully open state, the support members preferably move integrally with the sliders. In other words, in a case that a movement of the support members in the vehicle width direction with respect to the sliders occurs when the movable panel transitions from the descended state to the fully open state, there is a possibility that, for example, sliding resistance between the sliders and the guide rails increases or vibrations and abnormal noises occur on the sunroof device. That is, there is a possibility that the movable panel ceases to operate smoothly.

A need thus exists for a sunroof device which is not susceptible to the drawback mentioned above.

SUMMARY

A sunroof device that solves the above-described problem includes guide rails extending in a vehicle front-rear direction at both edge portions in a vehicle width direction of a roof opening portion formed in a roof of a vehicle, support members being fixed to a movable panel opening and closing the roof opening portion and configured in a movable manner with respect to the guide rails, and driving shoes moving along the guide rails while engaging with the support members. The movable panel is a movable panel performing opening and closing operations by transitioning among a fully closed position at which the movable panel closes the roof opening portion, a tilted-down position at which a rear edge portion of the movable panel is made to descend lower than at the fully closed position, and a fully open position that is a position more rearward of the vehicle than the tilted-down position and at which the movable panel opens the roof opening portion. The driving shoes move among a first position causing the movable panel to be arranged at the fully closed position, a second position causing the movable panel to be arranged at the tilted-down position, and a third position causing the movable panel to be arranged at the fully open position, and, when moving between the first position and the second position, cause rear edge portions of the support members to ascend or descend and, when moving between the second position and the third position, move integrally with the support members. Each of the support members and each of the driving shoes have a first contact portion and a second contact portion, respectively, that, when the driving shoe moves from the first position toward the second position, come close to each other in a direction perpendicular to the vehicle width direction and, when the driving shoe is positioned between the second position and the third position, come into contact with each other. One of the first contact portion and the second contact portion is a pressing portion, the other of the first contact portion and the second contact portion is an elastic body that, when the driving shoe is positioned between the second position and the third position, is pressed by the pressing portion and elastically deformed, and a length in the vehicle width direction of the elastic body is longer than the pressing portion.

According to an aspect of this disclosure, the sunroof device is capable of causing the movable panel to operate smoothly.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a vehicle provided with a sunroof device disclosed here will be explained with reference to the attached drawings. In this embodiment, directions of a sunroof device when the sunroof device is mounted on a vehicle will be used in the explanation. The vehicle width direction, the vehicle font-rear direction, and the vehicle up-down direction are simply referred to as the "width direction", the "front-rear direction", and the "up-down direction", respectively.

Figure 1:
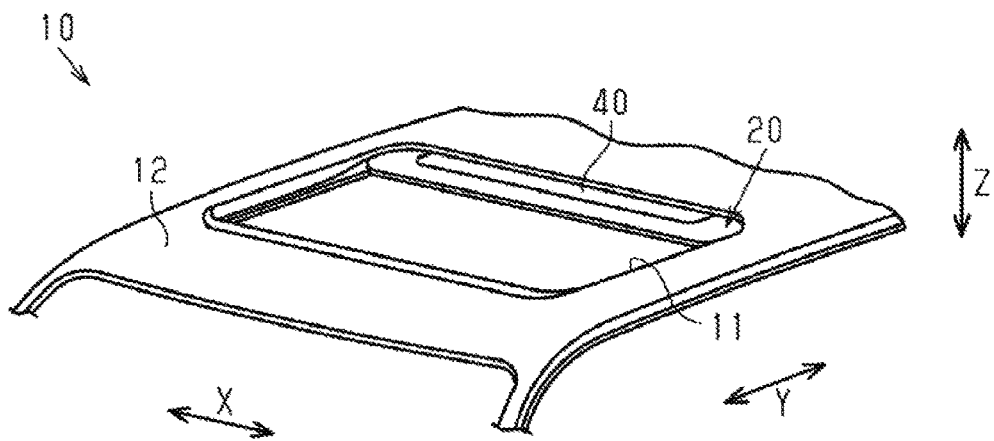
FIG. 1 is a perspective view illustrating a schematic configuration of a roof and surroundings thereof of a vehicle according to one embodiment.

As illustrated in FIG. 1, a vehicle 10 includes a roof 12 to which a roof opening portion 11 is formed and a sunroof device 20 that is mounted in the roof opening portion 11. The roof opening portion 11 is formed into, when viewed in plan from an up-down direction Z, a rectangular shape the lateral direction and the longitudinal direction of which are aligned with a front-rear direction Y and a width direction X, respectively.

Figure 2:
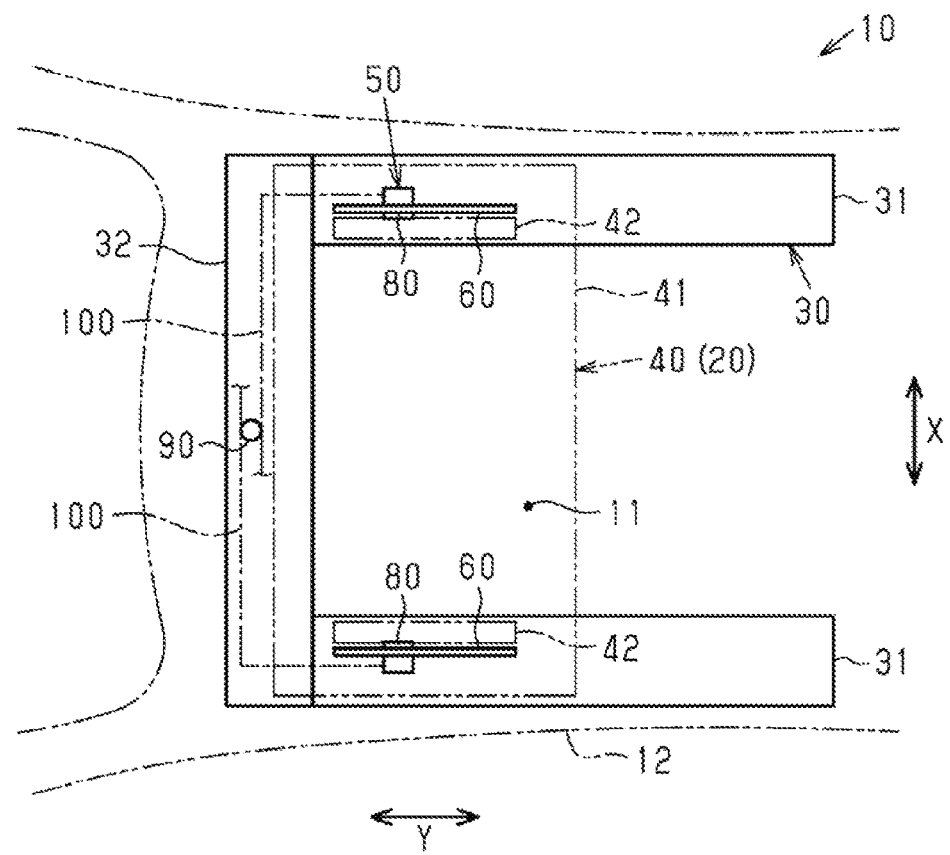
FIG. 2 is a plan view illustrating the schematic configuration of the roof and the surroundings thereof of the vehicle.

As illustrated in FIG. 2, the sunroof device 20 includes a base frame 30 that surrounds the periphery of the roof opening portion 11, a movable panel 40 that opens and closes the roof opening portion 11, and a drive device 50 that drives the movable panel 40.

Next, the base frame 30 will be described.

As illustrated in FIG. 2, the base frame 30 includes a pair of guide rails 31 that extend in the front-rear direction Y at both edge portions in the width direction X of the roof opening portion 11 and a front housing 32 that extends in the width direction X at a front edge portion of the roof opening portion 11.

Figure 3:
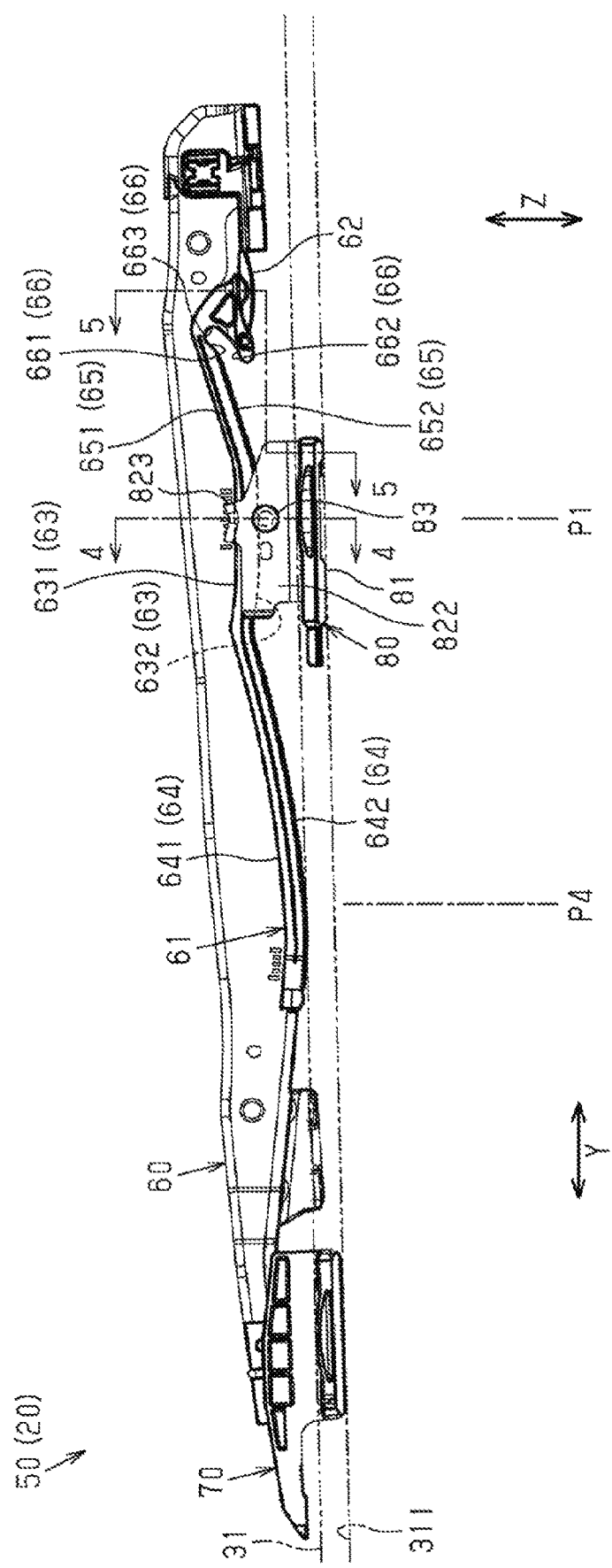
FIG. 3 is a side view of a sunroof device when a movable panel is positioned at a fully closed position.

Each of the guide rails 31 has a uniform cross-sectional shape across the whole length in the longitudinal direction thereof. As illustrated in FIG. 3, to each of the guide rails 31, a sliding groove 311 is formed across the whole length in the longitudinal direction thereof. The guide rails 31 may curve along the shape of the roof 12 of the vehicle 10. That is, it is assumed that examples of the guide rails 31, which extend in the front-rear direction Y, that are dealt with in this embodiment include guide rails having curved shapes. The front housing 32 couples front edge portions of the guide rails 31 to each other in the width direction X. The front housing 32 supports some constituent members of the drive device 50, which will be described later.

Next, the movable panel 40 will be described.

As illustrated in FIG. 2, the movable panel 40 is formed into, when viewed in plan from the up-down direction Z, a rectangular shape the size of which corresponds to the size of the roof opening portion 11. The movable panel 40 includes a translucent panel 41 that has translucency and a pair of fixing brackets 42 that are fixed to the undersurface of the translucent panel 41. The pair of fixing brackets 42 respectively extend along the edges on both sides in the width direction X of the movable panel 40. The translucent panel 41 and the pair of fixing brackets 42 are adhered to each other using, for example, urethane-based adhesive.

The movable panel 40 operates by transitioning among a fully closed position at which the movable panel 40 completely closes the roof opening portion 11, a tilted-up position at which a rear edge portion of the movable panel 40 has ascended higher than at the fully closed position, a tilted-down position at which the rear edge portion of the movable panel 40 has descended lower than at the fully closed position, and a fully open position that is a position more rearward than the tilted-up position and at which the movable panel 40 fully opens the roof opening portion 11. Specifically, the movable panel 40 performs a tilt-up operation from the fully closed position to the tilted-up position and a tilt-down operation from the tilted-up position to the fully closed position. In addition, the movable panel 40 performs a tilt-down operation from the fully closed position to the tilted-down position and a tilt-up operation from the tilted-down position to the fully closed position. Further, the movable panel 40 performs a sliding operation between the tilted-down position and the fully open position.

Note that, as illustrated in FIG. 1, the sunroof device 20 of this embodiment is a so-called inner sliding type sunroof device in which the movable panel 40 is housed in a space between the roof 12 and the vehicle interior at the fully open position.

Next, the drive device 50 will be described.

As illustrated in FIG. 3, the drive device 50 includes a pair of support members 60 that are fixed to the movable panel 40, a pair of driven shoes 70 that respectively move along the pair of guide rails 31, and a pair of driving shoes 80 that respectively move along the pair of guide rails 31. As illustrated in FIG. 2, the drive device 50 includes a motor 90 that is arranged in the front housing 32 and a pair of cables 100 that respectively transmit power of the motor 90 to the pair of driving shoes 80.

First, the support members 60 will be described.

As illustrated in FIG. 3, the support members 60 are, for example, insert molded bodies that are produced by covering a press-formed metal plate with resin. Each of the support members 60 is formed into a bar shape extending in the front-rear direction Y. Each of the support members 60 includes a guide portion 61 that projects in both directions in the width direction X and a pressing portion 62 that projects downward in a vicinity of the rear end of the support member 60. In each of the support members 60, both the guide portion 61 and the pressing portion 62 are portions formed of resin.

Figure 4:
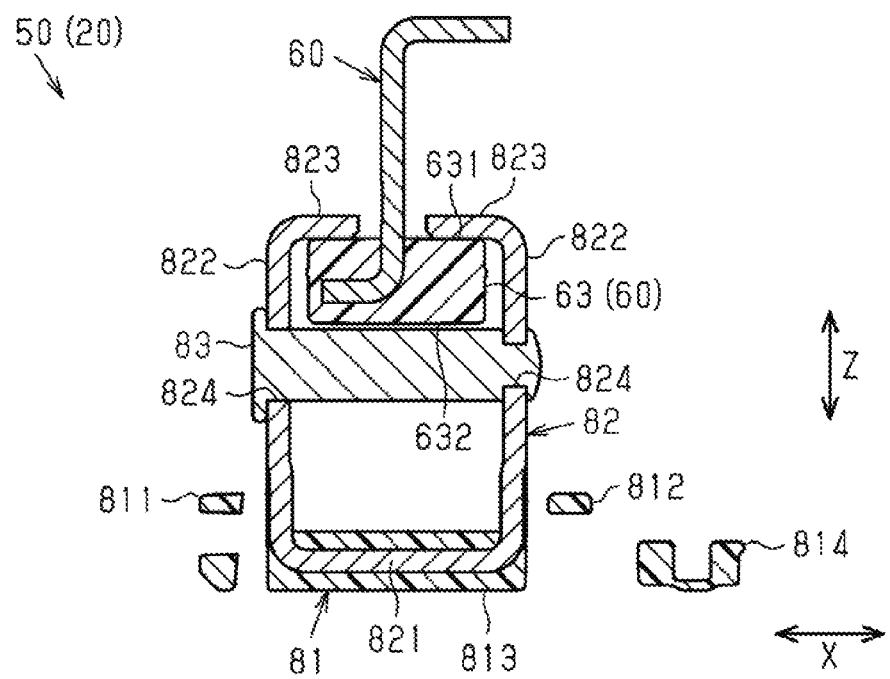
FIG. 4 is a cross-sectional view taken along the arrow line IV-IV in FIG. 3.

As illustrated in FIG. 3, the guide portion 61 is formed into a flat plate shape and extends in the longitudinal direction of the support member 60. As illustrated in FIG. 4, the guide portion 61 is formed on both sides in the width direction X of the support member 60 in such a way that portions on both sides constitute a pair. When, as illustrated in FIG. 3, the support member 60 takes such a position as to arrange the movable panel 40 at the fully closed position, the guide portion 61 includes a flat portion 63 that extends substantially in the front-rear direction Y, a front-side inclined portion 64 that extends downward as it proceeds forward from the front edge of the flat portion 63, and a rear-side inclined portion 65 that extends upward as it proceeds backward from the rear edge of the flat portion 63. The guide portion 61 also includes a restricting portion 66 that is disposed in the rear of the rear-side inclined portion 65.

The upper surfaces of the flat portion 63, the front-side inclined portion 64, and the rear-side inclined portion 65 constitute continuous upper-side guide surfaces 631, 641, and 651, respectively, and the lower surfaces of the flat portion 63, the front-side inclined portion 64, and the rear-side inclined portion 65 constitute continuous lower-side guide surfaces 632, 642, and 652, respectively. The upper-side guide surface 631 extends substantially in parallel with the lower-side guide surface 632 on the flat portion 63, the upper-side guide surface 641 extends substantially in parallel with the lower-side guide surface 642 on the front-side inclined portion 64, and the upper-side guide surface 651 extends substantially in parallel with the lower-side guide surface 652 on the rear-side inclined portion 65.

When, as illustrated in FIG. 3, the support member 60 takes such a position as to arrange the movable panel 40 at the fully closed position, the restricting portion 66 is a recessed portion that is recessed in an upward direction as it proceeds backward. The restricting portion 66 includes an upper-side guide surface 661 that continues from the lower-side guide surface 652 of the rear-side inclined portion 65, a lower-side guide surface 662 that extends along the upper-side guide surface 661, and a restricting surface 663 that connects the rear edges of the upper-side guide surface 661 and the lower-side guide surface 662 to each other.

Figure 5:
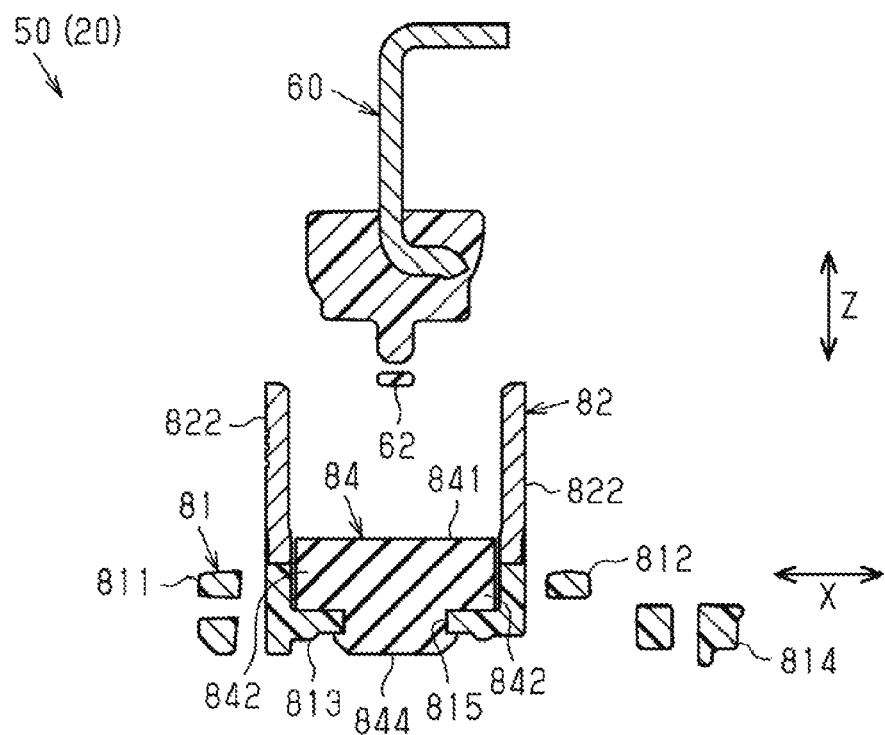
FIG. 5 is a cross-sectional view taken along the arrow line V-V in FIG. 3.

As illustrated in FIGS. 3 and 5, the pressing portion 62 is formed into a plate shape with the longitudinal direction thereof aligned with the front-rear direction Y. As illustrated in FIG. 3, the pressing portion 62 has a front edge portion and a rear edge portion supported and a middle portion in the longitudinal direction positioned lower than the front edge portion and the rear edge portion. That is, the pressing portion 62 curves in a circular-arc shape so as to swell downward. In addition, in this embodiment, the pressing portion 62 is equivalent to an example of a "first contact portion".

The support members 60 engage with the guide rails 31 via the driven shoes 70. The support members 60 are configured in a movable manner with respect to the guide rails 31 by means of the driven shoes 70 and the driving shoes 80. In addition, the pair of support members 60 are respectively fixed to the pair of fixing brackets 42 of the movable panel 40. That is, the pair of support members 60 support the movable panel 40 along both edges in the width direction X of the movable panel 40.

Succeedingly, the driven shoes 70 will be described.

The driven shoes 70 are formed of, for example, resin. As illustrated in FIG. 3, since the driven shoes 70 engage with the sliding grooves 311 of the guide rails 31, the driven shoes 70 are restricted from moving in the direction perpendicular to the longitudinal direction of the guide rails 31. The driven shoes 70 support tip portions of the support members 60 in a rotatable manner about an axis extending in the width direction X. In this manner, the support members 60 move along the guide rails 31 in conjunction with the driven shoes 70 and rotate about an axis extending in the width direction X with respect to the driven shoes 70.

Succeedingly, the driving shoes 80 will be described.

Figure 6:
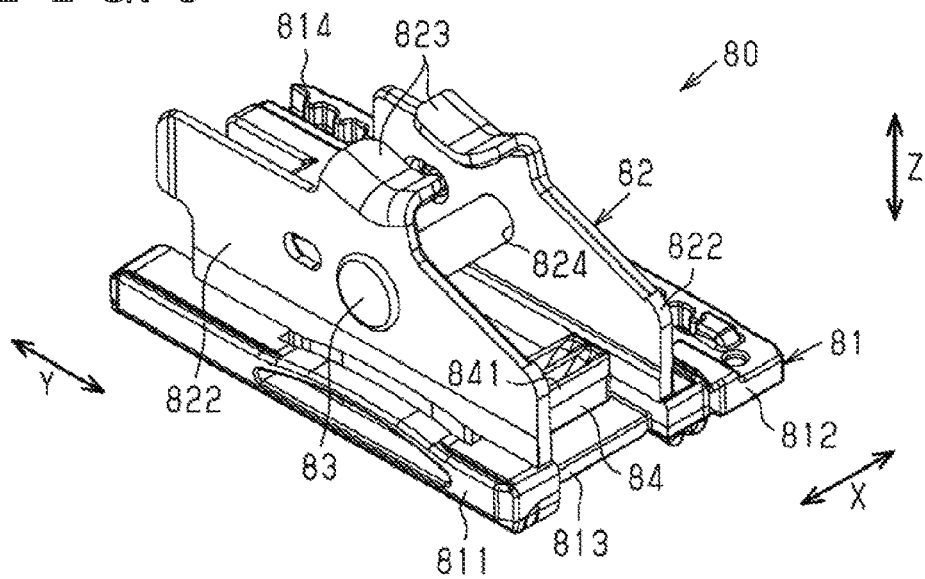
FIG. 6 is a perspective view of a driving shoe of a drive device.

As illustrated in FIG. 6, each of the driving shoes 80 includes a sliding portion 81 that slides with one of the guide rails 31, a body portion 82 that engages with one of the support members 60, a guide shaft 83 that penetrates the body portion 82 in the width direction X, and an elastic body 84 that is mounted on the sliding portion 81.

The sliding portion 81 is formed of a resin material. The sliding portion 81 includes a first sliding portion 811 that is arranged inward in the width direction X in the sliding groove 311 of one of the guide rails 31, a second sliding portion 812 that is arranged outward in the width direction X in the sliding groove 311, an intermediate portion 813 that connects the first sliding portion 811 and the second sliding portion 812 to each other in the width direction X, and a cable holding portion 814 that holds one end of one of the cables 100. The intermediate portion 813 is formed into a flat plate shape. As illustrated in FIG. 5, in the intermediate portion 813, an engagement hole 815 is formed in a penetrating manner in the thickness direction.

The body portion 82 is a portion formed by performing press working on a metal plate. As an example, the body portion 82 and the sliding portion 81 are integrated with each other by means of insert molding. As illustrated in FIG. 4, the body portion 82 includes a lower wall 821 that is formed into a rectangular plate shape, a pair of sidewalls 822 that extend upward from both edges in the width direction X of the lower wall 821, and a pair of engaging walls 823 that respectively extends in the width direction X from the upper edges of the pair of sidewalls 822.

The lower wall 821, the pair of sidewalls 822, and the pair of engaging walls 823 are formed into plate shapes. The lower wall 821 is a portion covered by the sliding portion 81. As illustrated in FIG. 4, in each of the sidewalls 822, a coupling hole 824, into which the guide shaft 83 is to be inserted, is formed in a penetrating manner in the width direction X. As illustrated in FIG. 6, each of the engaging walls 823 curves in a circular-arc shape when viewed from the side in the width direction X. Specifically, each of the engaging walls 823 curves in such a way that an intermediate portion in the front-rear direction Y is positioned lower than a front edge portion and a rear edge portion. The pair of engaging walls 823 respectively extend from the pair of sidewalls 822 in the directions in which the engaging walls 823 come close to each other. In the width direction X, a gap is formed between the pair of engaging walls 823. The guide shaft 83 couples the pair of sidewalls 822 to each other in the width direction X.

In each of the driving shoes 80, the length of an interval in the up-down direction Z between the pair of engaging walls 823 and the guide shaft 83 is substantially equal to the length in the up-down direction Z of the guide portion 61 of one of the support members 60. In addition, the outer diameter of the guide shaft 83 of the driving shoe 80 is substantially equal to the length of an interval between the upper-side guide surface 661 and lower-side guide surface 662 of the restricting portion 66 of one of the support members 60.

Figure 7:
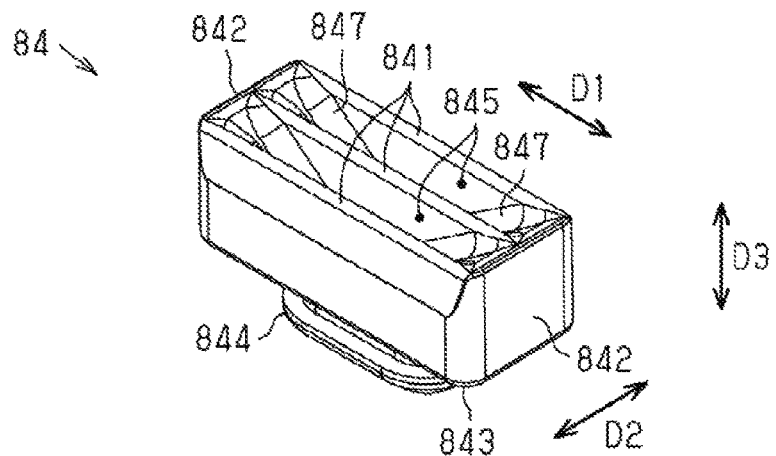
FIG. 7 is a perspective view of an elastic body of a driving shoe.
Figure 8:
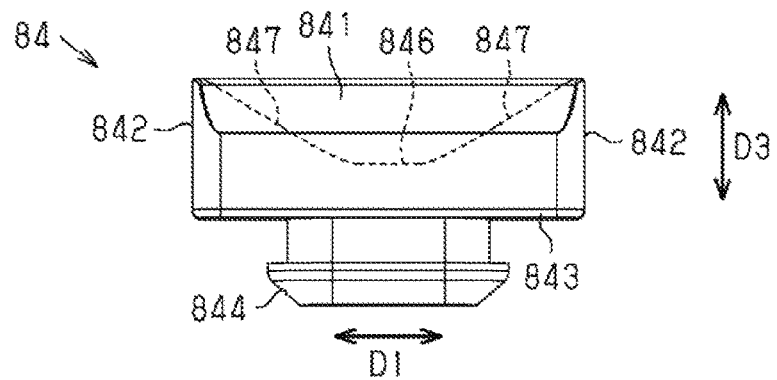
FIG. 8 is a front view of the elastic body of the driving shoe.

As illustrated in FIGS. 7 and 8, the elastic body 84 is formed into, when viewed in plan, a substantial rectangular shape. In the description of the elastic body 84, it is assumed that, in a shape of the elastic body 84 when viewed in plan, the longitudinal direction and the lateral direction are a first direction D1 and a second direction D2, respectively, and the direction perpendicular to both the first direction D1 and the second direction D2 is a third direction D3. In this embodiment, the elastic body 84 is equivalent to a "second contact portion" and is an integrated object made of an elastomer, such as rubber and resin. For this reason, the modulus of elasticity of the elastic body 84 is smaller than the modulus of elasticity of the pressing portion 62.

The elastic body 84 includes a plurality of elastic walls 841 each of which is formed into a rectangular plate shape, a pair of holding walls 842 that hold both edge portions in the first direction D1 of the plurality of elastic walls 841, a bottom wall 843 that is arranged on one side in the third direction D3 of the plurality of elastic walls 841, and an engaging portion 844 that projects out of the bottom wall 843 in the third direction D3.

Each of the elastic walls 841 is formed into, when viewed from the front in the second direction D2, a rectangular shape the lateral direction and the longitudinal direction of which are aligned with the first direction D1 and the third direction D3, respectively. The plurality of elastic walls 841 are arranged at equal intervals in the second direction D2. The interval at which the plurality of elastic walls 841 are formed is greater than the thickness in the second direction D2 of each of the elastic walls 841. Although, in this embodiment, the elastic body 84 includes three elastic walls 841, the elastic body 84 may include two or less elastic walls 841 or four or more elastic walls 841. In addition, the length in the first direction D1 of the elastic walls 841 is longer than the length in the width direction X of the pressing portion 62 of one of the support members 60.

The pair of holding walls 842 respectively connect to both edge portions in the first direction D1 of the elastic walls 841. In the second direction D2, the thickness of each of the holding walls 842 is thicker than the thickness of the elastic walls 841. In other words, in the second direction D2, the thickness of the elastic walls 841 is thinner than the thickness of each of the holding wall 842. The engaging portion 844 is formed on the opposite side to the elastic walls 841 with the bottom wall 843 interposed therebetween.

In addition, to the elastic body 84, recessed portions 845 are formed between elastic walls 841 adjacent to each other in the second direction D2. Each of the recessed portions 845 has a shape in which the middle portion in the first direction D1 is deepest and that increasingly becomes shallower as it proceeds toward each end portion in the first direction D1. Specifically, as illustrated in FIG. 8, each of the recessed portions 845 includes a first bottom surface 846 that crosses the third direction D3 at right angles and a pair of second bottom surfaces 847 that cross both the first direction D1 and the third direction D3. The pair of second bottom surfaces 847 extend from both edges in the second direction D2 of the first bottom surface 846.

As illustrated in FIGS. 5 and 6, the elastic body 84 is mounted on the sliding portion 81 in such a way that the first direction D1, the second direction D2, and the third direction D3 are aligned with the width direction X, the front-rear direction Y, and the up-down direction, respectively. On this occasion, pressing the elastic body 84 against the sliding portion 81 with the engaging portion 844 directed to the engagement hole 815 of the sliding portion 81 causes the engaging portion 844 to be inserted into the engagement hole 815 of the sliding portion 81 while being elastically deformed. Then, the engaging portion 844 and bottom wall 843 of the elastic body 84 pinching a peripheral portion of the engagement hole 815 of the intermediate portion 813 makes the engaging portion 844 difficult to be removed from the sliding portion 81 easily. On the other hand, exerting a predetermined upward load on the sliding portion 81 causes the engaging portion 844 to come off from the engagement hole 815 of the sliding portion 81 while being elastically deformed. In this respect, the elastic body 84 of this embodiment can be said to be configured to be freely attachable/detachable with respect to the sliding portion 81.

As illustrated in FIG. 3, the sliding portion 81, specifically, the first sliding portion 811 and the second sliding portion 812, being arranged in the sliding groove 311 of one of the guide rails 31 causes each of the driving shoes 80 to be allowed to move in the longitudinal direction of the guide rail 31 and to be restricted from moving in the direction perpendicular to the longitudinal direction of the guide rail 31. The cables 100 pushing or pulling the sliding portions 81 along the guide rails 31 causes the driving shoes 80 to move along the guide rails 31. As illustrated in FIG. 4, each of the driving shoes 80 engages with one of the support members 60 by the guide portion 61 of the support member 60 being inserted into a region surrounded by the pair of sidewalls 822, pair of engaging walls 823, and guide shaft 83 of the driving shoe 80.

Operation of this embodiment will be described.

As illustrated in FIG. 3, when each of the driving shoes 80 is positioned at a first position P1, the engaging walls 823 and guide shaft 83 of the driving shoe 80 engage with the upper-side guide surface 631 and lower-side guide surface 632 of the flat portion 63 of one of the support members 60, respectively. When the driving shoes 80 are positioned at the first position P1, the movable panel 40 is positioned at the fully closed position. In this embodiment, the position of each of the driving shoes 80 is represented by the center position of the guide shaft 83.

Figure 9:
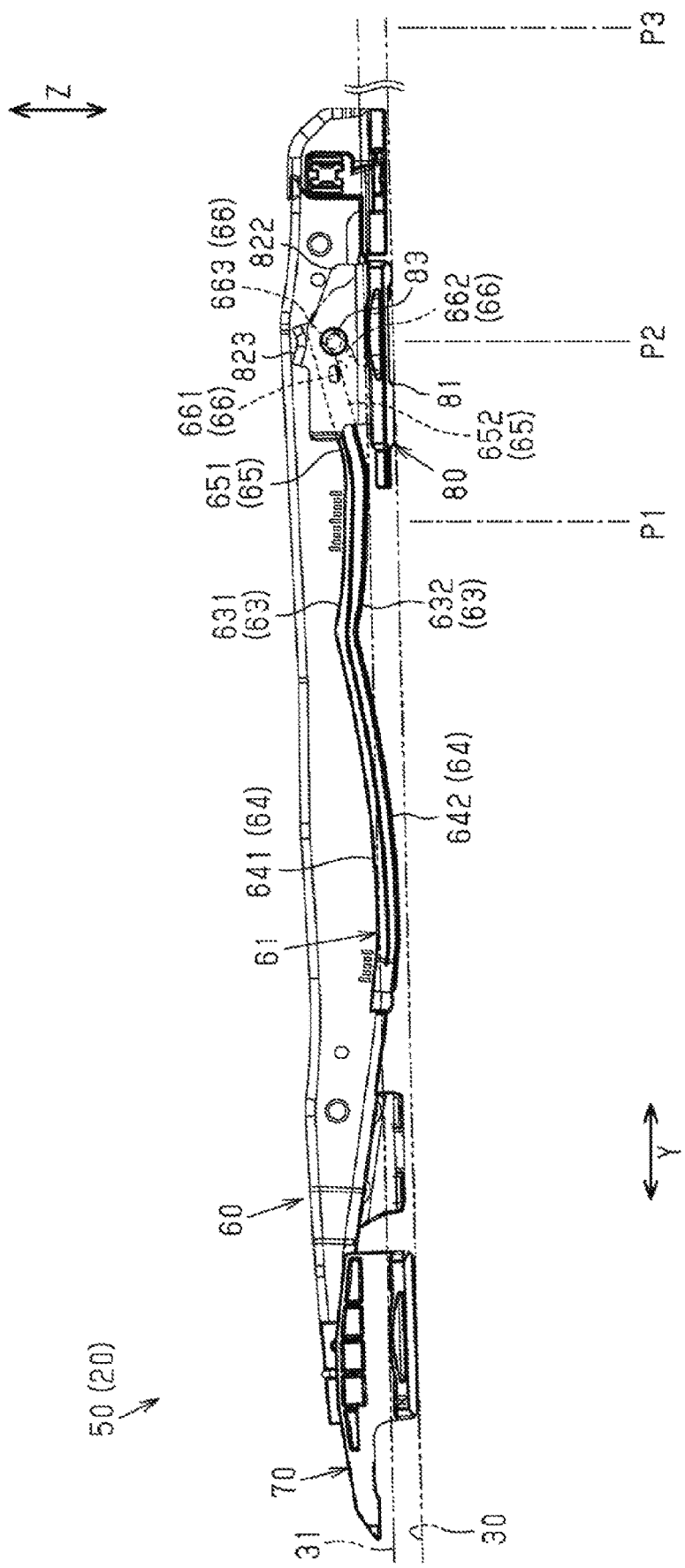
FIG. 9 is a side view of the sunroof device when the movable panel is positioned at a tilted-down position.

As illustrated in FIG. 9, when each of the driving shoes 80 moves rearward from the first position P1, the pair of engaging walls 823 of the driving shoe 80 slide with the upper-side guide surface 651 of the rear-side inclined portion 65 of one of the support members 60. On this occasion, the driving shoe 80 moves rearward, pushing down the rear-side inclined portion 65 with the pair of engaging walls 823. Succeedingly, the guide shaft 83 of the driving shoe 80 slides with the lower-side guide surface 662 of the restricting portion 66. On this occasion, the driving shoe 80 moves rearward, pushing down the restricting portion 66 with the guide shaft 83.

Therefore, the support members 60 rotate about front edge portions thereof in such a way that rear edge portions thereof descend with respect to the front edge portions and the movable panel 40 thereby performs a tilt-down operation. As illustrated in FIG. 9, when each of the driving shoes 80 subsequently reaches a second position P2, the guide shaft 83 of the driving shoe 80 comes into contact with the restricting surface 663 of the restricting portion 66 of one of the support members 60 and the driving shoe 80 thus becomes unable to move rearward relatively with respect to the support members 60. When the driving shoes 80 are positioned at the second position P2, the movable panel 40 is positioned at the tilted-down position.

When each of the driving shoes 80 moves rearward from the first position P1, the pressing portion 62 of one of the support members 60 comes close to the elastic body 84 of the driving shoe 80. The direction in which the pressing portion 62 and the elastic body 84 come close to each other is a direction that crosses the width direction X at right angles. Specifically, the direction in which the pressing portion 62 and the elastic body 84 come close to each other is a direction obtained by adding a rotational direction that is a movement direction of the support member 60 including the pressing portion 62 and a rearward direction that is a movement direction of the driving shoe 80 including the elastic body 84 to each other.

Figure 10:
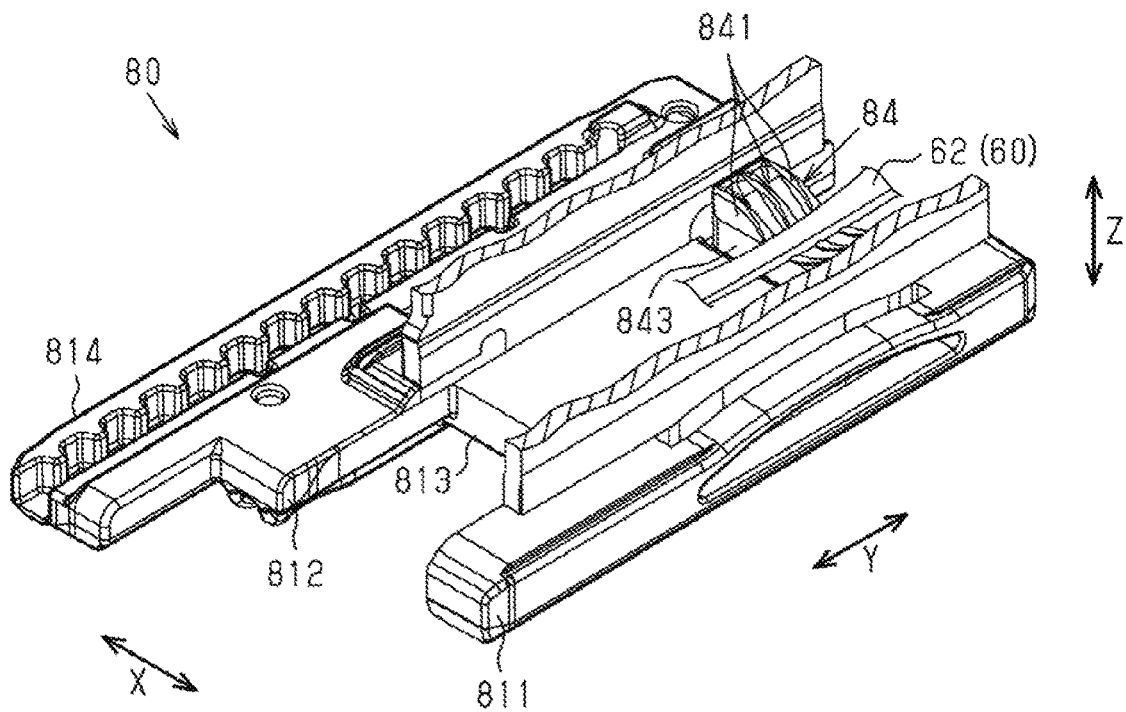
FIG. 10 is a partial perspective view of the driving shoe when a pressing portion presses the elastic body.
Figure 11:
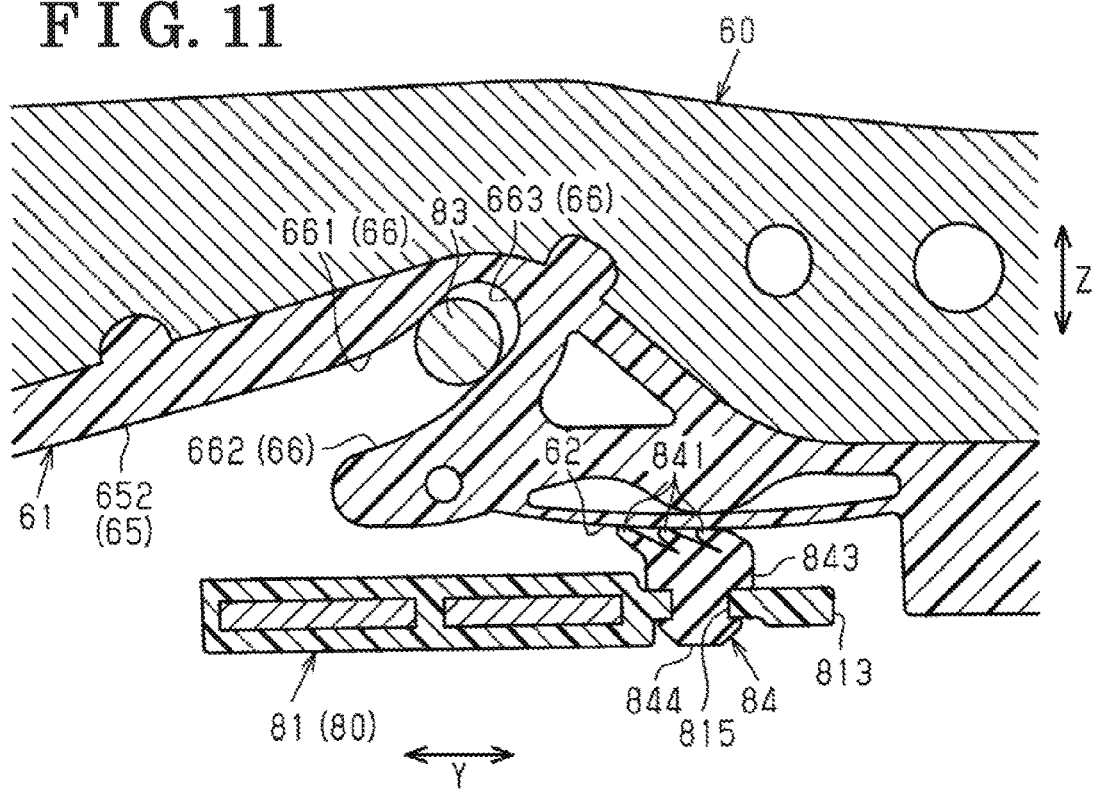
FIG. 11 is a partial cross-sectional view of the driving shoe when the pressing portion presses the elastic body.

When the guide shaft 83 of each of the driving shoes 80 slides with the lower-side guide surface 662 of the restricting portion 66 of one of the support members 60, the pressing portion 62 of the support member 60 and the elastic body 84 of the driving shoe 80 come into contact with each other. Further, the pressing portion 62 of the support member 60 presses the elastic body 84 of the driving shoe 80. When the driving shoe 80 reaches the second position P2, portions of the plurality of elastic walls 841 that are pressed by the pressing portion 62 are displaced so as to fall down forward and portions of the plurality of elastic walls 841 that are not pressed by the pressing portion 62 are displaced in the width direction X so as to follow the portions pressed by the pressing portion 62, as illustrated in FIGS. 10 and 11. That is, the pressing portion 62 of the support member 60 being pinched by the elastic body 84 from both sides in the width direction X causes the pressing portion 62 to become less likely to be displaced in the width direction X with respect to the elastic body 84. That it, the support member 60 becomes less likely to be displaced in the width direction X with respect to the driving shoe 80.

As illustrated in FIG. 9, when the driving shoes 80 move rearward from the second position P2, the support members 60 move rearward in conjunction with the driving shoes 80. For this reason, the support members 60 move rearward along the guide rails 31, and the movable panel 40 performs a sliding operation rearward. When the driving shoes 80 reach a third position P3 that is the rearmost position within a moving range of the driving shoes 80, the movable panel 40 is positioned at the fully open position.

When each of the driving shoes 80 moves rearward from the second position P2 toward the third position P3, the pressing portion 62 of one of the support members 60 is pinched by the elastic body 84 of the driving shoe 80 from both sides in the width direction X and the pressing portion 62 of the support member 60 also presses the elastic body 84 of the driving shoe 80 downward. For this reason, the driving shoe 80 moves rearward integrally with the support member 60.

As illustrated in FIG. 9, when the driving shoes 80 move forward from the third position P3, the support members 60 move forward in conjunction with the driving shoes 80. For this reason, the support members 60 move forward along the guide rails 31, and the movable panel 40 performs a sliding operation forward. When the driving shoes 80 reach the second position P2, the movable panel 40 is positioned at the tilted-down position.

Note that, when the driving shoes 80 move forward from the third position P3 toward the second position P2, the driving shoes 80 move integrally with the support members 60 as with when the driving shoes 80 move rearward from the second position P2 toward the third position P3.

As illustrated in FIG. 9, when each of the driving shoes 80 moves forward from the second position P2, the guide shaft 83 of the driving shoe 80 slides with the upper-side guide surface 661 of the restricting portion 66. On this occasion, the driving shoe 80 moves forward, pushing up the restricting portion 66 with the guide shaft 83. Succeedingly, the guide shaft 83 of the driving shoe 80 slides with the lower-side guide surface 652 of the rear-side inclined portion 65 of one of the support members 60. On this occasion, the driving shoe 80 moves forward, pushing up the rear-side inclined portion 65 with the guide shaft 83.

Therefore, the support members 60 rotate about the front edge portions thereof in such a way that the rear edge portions thereof ascend with respect to the front edge portions and the movable panel 40 thereby performs a tilt-up operation. When the driving shoes 80 reach the first position P1, the movable panel 40 is positioned at the fully closed position.

When each of the driving shoes 80 moves forward from the second position P2, the pressing portion 62 of one of the support members 60 separates from the elastic body 84 of the driving shoe 80. In particular, when the guide shaft 83 of the driving shoe 80 slides with the upper-side guide surface 661 of the restricting portion 66 of the support member 60, the amount of interference between the pressing portion 62 of the support member 60 and the elastic body 84 of the driving shoe 80 gradually decreases. For this reason, in the elastic body 84 of the driving shoe 80, portions that the support member 60 has ceased to press are gradually restored to original shapes. In addition, the separation of the pressing portion 62 of the support member 60 from the elastic body 84 of the driving shoe 80 enables the driving shoe 80 and the support member 60 to move separately.

Although illustration is omitted, when each of the driving shoes 80 moves forward from the first position P1, the guide shaft 83 of the driving shoe 80 slides with the lower-side guide surface 642 of the front-side inclined portion 64 of one of the support members 60. On this occasion, the driving shoe 80 moves forward, pushing up the front-side inclined portion 64 with the guide shaft 83. For this reason, the support members 60 rotate about the front edge portions thereof in such a way that the rear edge portions thereof ascend with respect to the front edge portions and the movable panel 40 thereby performs a tilt-up operation. When the driving shoes 80 reach a fourth position P4 illustrated in FIG. 3, the movable panel 40 is positioned at the tilted-up position.

On the other hand, when each of the driving shoes 80 moves rearward from the fourth position P4, the pair of engaging walls 823 of the driving shoe 80 slide with the upper-side guide surface 641 of the front-side inclined portion 64 of one of the support members 60. On this occasion, the driving shoe 80 moves rearward, pushing down the front-side inclined portion 64 with the pair of engaging walls 823. For this reason, the support members 60 rotate about the front edge portions thereof in such a way that the rear edge portions thereof descend with respect to the front edge portions and the movable panel 40 thereby performs a tilt-down operation. When the driving shoes 80 reach the first position P1, the movable panel 40 is positioned at the fully closed position.

Advantageous effects of this embodiment will be described.

(1) In the sunroof device 20, since, when the driving shoes 80 are positioned between the second position P2 and the third position P3, the pressing portions 62 press the elastic bodies 84 in a direction perpendicular to the width direction X, portions of the elastic bodies 84 pressed by the pressing portions 62 are elastically deformed in a direction perpendicular to the width direction X and portions of the elastic bodies 84 not pressed by the pressing portions 62 pinch the pressing portions 62 in the width direction X. For this reason, in respect that, when the driving shoes 80 are positioned between the second position P2 and the third position P3, relative movement of the pressing portions 62 with respect to the elastic bodies 84 are restricted, relative movement of the support members 60 with respect to the driving shoes 80 are restricted. As a result, when the driving shoes 80 move from the second position P2 to the third position P3, the support members 60 are facilitated to move integrally with the driving shoes 80. In this manner, the sunroof device 20 enables the movable panel 40 to operate smoothly.

(2) In each of the elastic bodies 84, the thickness in the front-rear direction Y of the elastic walls 841 is thinner than the thickness in the front-rear direction Y of each of the holding walls 842. For this reason, in respect that the thickness of the elastic walls 841 is thin, the sunroof device 20 enables the elastic walls 841 pressed by the pressing portion 62 to be deformed substantially. Thus, the sunroof device 20 facilitates portions of the elastic walls 841 not pressed by the pressing portion 62 to pinch the pressing portion 62 from both sides in the width direction X.

(3) Each of the elastic bodies 84 includes a plurality of elastic walls 841 lined up in the front-rear direction Y. For this reason, even when a problem occurs on some elastic walls 841 among the plurality of elastic walls 841, the sunroof device 20 enables the other elastic walls 841 to fulfill a function of the elastic body 84 to retain a position of one of the support members 60.

(4) The elastic body 84 is configured to be freely attachable/detachable with respect to the sliding portion 81 of each of the driving shoes 80. For this reason, the sunroof device 20 facilitates replacement of the elastic bodies 84 with respect to the driving shoes 80.

(5) Each of the pressing portions 62 extends in the front-rear direction Y and also curves in a circular-arc shape so as to swell downward. For this reason, in the sunroof device 20, the pressing portions 62 become likely to be deformed by reaction force when pressing the elastic bodies 84. In this respect, the sunroof device 20 enables the elastic bodies 84 to be suppressed from being excessively compressed by the pressing portions 62.

This embodiment can be embodied by being modified as follows. This embodiment and the following modifications can be embodied by being combined with one another unless technically contradicting one another.

The shapes and formation positions of the pressing portions 62 can be appropriately changed. For example, the support members 60 do not have to include apparent pressing portions as long as being able to press the elastic bodies 84 with rear edge portions.

The pressing portions 62 may have the undersurfaces thereof formed into rough surfaces. This configuration causes friction force between the pressing portions 62 and the elastic bodies 84 when the pressing portions 62 press the elastic bodies 84 to be increased and thereby causes the pressing portions 62 and the elastic bodies 84 to be less likely to move relatively to each other.

The shapes of the elastic bodies 84 and the shapes of the pressing portions 62 can be appropriately changed.

Figure 12:
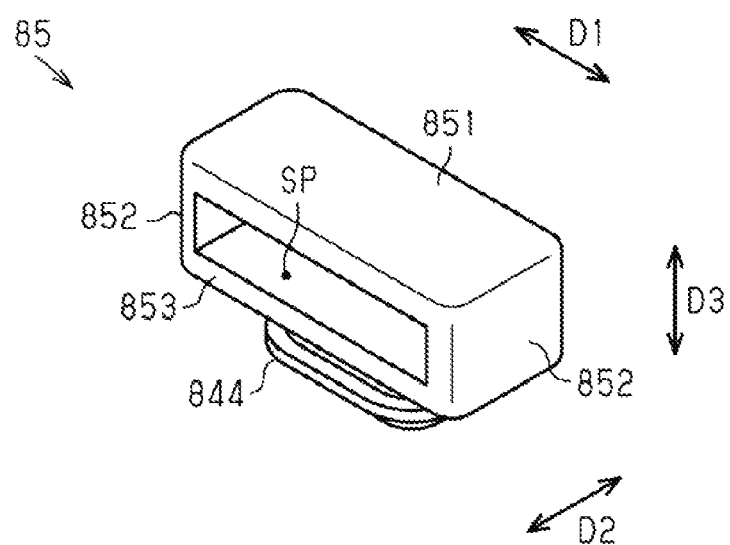
FIG. 12 is a perspective view of an elastic body according to a variation.

An elastic body 85 illustrated in FIG. 12 may be used in place of an elastic body 84. As illustrated in FIG. 12, the elastic body 85 includes an upper wall 851, a pair of coupling walls 852, a bottom wall 853, and an engaging portion 844.

The upper wall 851 and the bottom wall 853 are formed into, when viewed in plan from the third direction D3, rectangular plate shapes. Specifically, each of the upper wall 851 and the bottom wall 853 is formed into, when viewed in plan from the third direction D3, a rectangular shape the lateral direction and the longitudinal direction of which are aligned with the first direction D1 and the third direction D3, respectively. The lengths in the first direction D1 of the upper wall 851 and the bottom wall 853 are longer than the length in the width direction X of the pressing portion 62 of one of the support members 60. The pair of coupling walls 852 are formed into rectangular plate shapes. The pair of coupling walls 852 connect both edge portions in the first direction D1 of the upper wall 851 and both edge portions in the first direction D1 of the bottom wall 853 to each other in the third direction D3, respectively. When viewed from the front in the second direction D2, a space SP formed into a substantial rectangular parallelepiped shape is formed among the upper wall 851, the pair of coupling walls 852, and the bottom wall 853. The elastic body 85 is, as with the above-described embodiment, preferably an integrated object made of an elastomer, such as rubber and resin.

The elastic body 85 is mounted on a sliding portion 81 in such a way that the first direction D1, the second direction D2, and the third direction D3 are aligned with the width direction X, the front-rear direction Y, and the up-down direction, respectively. When the elastic body 85 is pressed by a pressing portion 62, a middle portion within the upper wall 851 that is pressed by the pressing portion 62 is displaced downward so as to retreat into the space SP and, at the same time, side portions within the upper wall 851 that are not pressed by the pressing portion 62 are displaced so as to follow the middle portion. As a result, the elastic body 85 becomes capable of pinching the pressing portion 62 from both sides in the width direction X.

As each of the elastic bodies 84, an elastic body 84 that is simply formed into a rectangular parallelepiped shape may be used as long as having a modulus of elasticity sufficient for deformation by the pressing of the pressing portion 62.

Although, in the above-described embodiment, the support members 60 have the pressing portions 62 and the driving shoes 80 have the elastic bodies 84, it can also be configured such that the support members 60 have the elastic bodies 84 and the driving shoes 80 have the pressing portions 62. In this case, each of the elastic bodies 84 is preferably configured to be freely attachable/detachable in one of the support members 60.

The direction in which the pressing portion 62 and the elastic body 84 relatively come close to each other when each of the driving shoes 80 moves from the first position P1 to the second position P2 varies according to inclination of the lower-side guide surface 662 of the restricting portion 66 of one of the support members 60. For this reason, by changing the inclination of the lower-side guide surface 662, the direction in which the pressing portion 62 presses the elastic body 84 may be changed to a pressing direction enabling the elastic body 84 to pinch the pressing portion 62 more greatly.

A sunroof device that solves the above-described problem includes guide rails extending in a vehicle front-rear direction at both edge portions in a vehicle width direction of a roof opening portion formed in a roof of a vehicle, support members being fixed to a movable panel opening and closing the roof opening portion and configured in a movable manner with respect to the guide rails, and driving shoes moving along the guide rails while engaging with the support members. The movable panel is a movable panel performing opening and closing operations by transitioning among a fully closed position at which the movable panel closes the roof opening portion, a tilted-down position at which a rear edge portion of the movable panel is made to descend lower than at the fully closed position, and a fully open position that is a position more rearward of the vehicle than the tilted-down position and at which the movable panel opens the roof opening portion. The driving shoes move among a first position causing the movable panel to be arranged at the fully closed position, a second position causing the movable panel to be arranged at the tilted-down position, and a third position causing the movable panel to be arranged at the fully open position, and, when moving between the first position and the second position, cause rear edge portions of the support members to ascend or descend and, when moving between the second position and the third position, move integrally with the support members. Each of the support members and each of the driving shoes have a first contact portion and a second contact portion, respectively, that, when the driving shoe moves from the first position toward the second position, come close to each other in a direction perpendicular to the vehicle width direction and, when the driving shoe is positioned between the second position and the third position, come into contact with each other. One of the first contact portion and the second contact portion is a pressing portion, the other of the first contact portion and the second contact portion is an elastic body that, when the driving shoe is positioned between the second position and the third position, is pressed by the pressing portion and elastically deformed, and a length in the vehicle width direction of the elastic body is longer than the pressing portion.

In the sunroof device configured as described above, when the driving shoe is positioned between the second position and the third position, the pressing portion presses the elastic body in a direction perpendicular to the vehicle width direction. For this reason, a portion of the elastic body that is pressed by the pressing portion is deformed in a pressing direction of the pressing portion and portions of the elastic body that are not pressed by the pressing portion are deformed so as to follow the portion pressed by the pressing portion. As a result, the elastic body is capable of pinching the pressing portion from both sides in the vehicle width direction with the portions not pressed by the pressing portion. Therefore, in respect that, when the driving shoe moves between the second position and the third position, relative movement of the pressing portion with respect to the elastic body is restricted, relative movement of the support member with respect to the driving shoe is restricted. As a result, the sunroof device enables the movable panel to smoothly operate between the tilted-down position and the fully open position.

In the above-described sunroof device, the elastic body may include an elastic wall extending in the vehicle width direction and holding walls holding both edge portions in the vehicle width direction of the elastic wall, and, in the vehicle front-rear direction, thickness of the elastic wall may be thinner than thickness of each of the holding walls.

The sunroof device configured as described above, in respect that the thickness of the elastic wall is thinner than the thickness of one of the holding walls, enables the elastic wall pressed by the pressing portion to be deformed substantially. For this reason, when the driving shoe is positioned between the second position and the third position, the sunroof device facilitates the elastic wall to pinch the pressing portion in the vehicle width direction.

In the above-described sunroof device, the elastic body may include a plurality of the elastic walls lined up in the vehicle front-rear direction.

Even when a problem occurs on some elastic walls among the plurality of elastic walls, the sunroof device configured as described above enables the other elastic walls to fulfill a function of retaining a posture of the support member.

In the above-described sunroof device, the elastic body may be configured to be freely attachable/detachable.

The sunroof device configured as described above facilitates replacement of the elastic body in the support members or the driving shoes.

In the above-described sunroof device, the pressing portion may extend in the vehicle front-rear direction, be formed into a plate shape with both edges in the vehicle front-rear direction being supported, and curve in a circular-arc shape so as to swell downward of the vehicle.

In the sunroof device configured as described above, the pressing portion becomes likely to be deformed by reaction force when pressing the elastic body. In this respect, the sunroof device enables the pressing portion to be suppressed from excessively compressing the elastic body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof device comprising:
    guide rails extending in a vehicle front-rear direction at both edge portions in a vehicle width direction of a roof opening portion formed in a roof of a vehicle;
    support members being fixed to a movable panel opening and closing the roof opening portion and configured in a movable manner with respect to the guide rails; and
    driving shoes moving along the guide rails while engaging with the support members, wherein
    the movable panel is a movable panel performing opening and closing operations by transitioning among a fully closed position at which the movable panel closes the roof opening portion, a tilted-down position at which a rear edge portion of the movable panel is made to descend lower than at the fully closed position, and a fully open position that is a position more rearward of the vehicle than the tilted-down position and at which the movable panel opens the roof opening portion,
    the driving shoes move among a first position causing the movable panel to be arranged at the fully closed position, a second position causing the movable panel to be arranged at the tilted-down position, and a third position causing the movable panel to be arranged at the fully open position, and, when moving between the first position and the second position, cause rear edge portions of the support members to ascend or descend and, when moving between the second position and the third position, move integrally with the support members,
    each of the support members and each of the driving shoes have a first contact portion and a second contact portion, respectively, that, when the driving shoe moves from the first position toward the second position, come close to each other in a direction perpendicular to the vehicle width direction, and, when the driving shoe is positioned between the second position and the third position, come into contact with each other,
    one of the first contact portion and the second contact portion is a pressing portion,
    another of the first contact portion and the second contact portion is an elastic body that, when the driving shoe is positioned between the second position and the third position, is pressed by the pressing portion and elastically deformed, and
    a length in the vehicle width direction of the elastic body is longer than the pressing portion.

2. The sunroof device according to claim 1, wherein
    the elastic body includes an elastic wall extending in the vehicle width direction and holding walls holding both edge portions in the vehicle width direction of the elastic wall, and,
    in the vehicle front-rear direction, thickness of the elastic wall is thinner than thickness of each of the holding walls.

3. The sunroof device according to claim 2, wherein
    the elastic body includes a plurality of the elastic walls lined up in the vehicle front-rear direction.

4. The sunroof device according to claim 1, wherein
    the elastic body is configured to be freely attachable/detachable.

5. The sunroof device according to claim 2, wherein the elastic body is configured to be freely attachable/detachable.

6. The sunroof device according to claim 3, wherein the elastic body is configured to be freely attachable/detachable.

7. The sunroof device according to claim 1, wherein the pressing portion extends in the vehicle front-rear direction, is formed into a plate shape with both edges in the vehicle front-rear direction being supported, and curves in a circular-arc shape so as to swell downward of the vehicle.

8. The sunroof device according to claim 2, wherein the pressing portion extends in the vehicle front-rear direction, is formed into a plate shape with both edges in the vehicle front-rear direction being supported, and curves in a circular-arc shape so as to swell downward of the vehicle.

9. The sunroof device according to claim 3, wherein the pressing portion extends in the vehicle front-rear direction, is formed into a plate shape with both edges in the vehicle front-rear direction being supported, and curves in a circular-arc shape so as to swell downward of the vehicle.

10. The sunroof device according to claim 4, wherein the pressing portion extends in the vehicle front-rear direction, is formed into a plate shape with both edges in the vehicle front-rear direction being supported, and curves in a circular-arc shape so as to swell downward of the vehicle.

11. The sunroof device according to claim 5, wherein the pressing portion extends in the vehicle front-rear direction, is formed into a plate shape with both edges in the vehicle front-rear direction being supported, and curves in a circular-arc shape so as to swell downward of the vehicle.

12. The sunroof device according to claim 6, wherein the pressing portion extends in the vehicle front-rear direction, is formed into a plate shape with both edges in the vehicle front-rear direction being supported, and curves in a circular-arc shape so as to swell downward of the vehicle.

\* \* \* \* \*